United States Patent
Wang et al.

(10) Patent No.: US 11,334,551 B2
(45) Date of Patent: May 17, 2022

(54) METHOD, DEVICE, AND STORAGE MEDIUM FOR STORING DETERMINANT TEXT

(71) Applicant: BEIJING BAIDU NETCOM SCIENCE AND TECHNOLOGY CO., LTD., Beijing (CN)

(72) Inventors: Yang Wang, Beijing (CN); Xunchao Song, Beijing (CN); Pengcheng Yuan, Beijing (CN); Haiping Zhang, Beijing (CN); Yifei Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/038,276

(22) Filed: Sep. 30, 2020

(65) Prior Publication Data

US 2021/0216520 A1    Jul. 15, 2021

(30) Foreign Application Priority Data

Jan. 10, 2020    (CN) .......................... 202010025931.2

(51) Int. Cl.
     *G06F 16/22*          (2019.01)
     *G06F 16/2455*      (2019.01)

(52) U.S. Cl.
     CPC ...... *G06F 16/2282* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 8,037,108 B1* | 10/2011 | Chang | ................... G06F 16/214 707/803 |
| 8,984,031 B1* | 3/2015 | Todd | ....................... G06F 16/13 707/823 |
| 2008/0243770 A1 | 10/2008 | Aasman | |
| 2011/0208759 A1* | 8/2011 | Zellweger | ........... G06F 16/2428 707/754 |

(Continued)

FOREIGN PATENT DOCUMENTS

| | | |
|---|---|---|
| JP | 2000305822 A | 11/2000 |
| JP | 2014511587 A | 5/2014 |
| JP | 2016053976 A | 4/2016 |

OTHER PUBLICATIONS

European Patent Application No. 20200480.0 extended Search and Opinion dated Mar. 24, 2021, 13 pages.

(Continued)

*Primary Examiner* — Christopher J Raab
(74) *Attorney, Agent, or Firm* — Lathrop GPM LLP (57) ABSTRACT

A method for storing a determinant text, an electronic device, and a computer-readable storage medium is disclosed. The method includes: obtaining a determinant text that is to be stored, the determinant text including a plurality of fields; obtaining valid fields from the plurality of fields; querying a field type table according to the valid fields to generate a data description field of the determinant text; determining a value storage field of the determinant text according to contents of the plurality of fields and the field type table; and storing the data description field and the value storage field to store the determinant text.

12 Claims, 4 Drawing Sheets

(56) References Cited

U.S. PATENT DOCUMENTS

2015/0347484 A1* 12/2015 Klauke ................ G06F 16/221
 707/607
2017/0255709 A1* 9/2017 Cho .................... G06F 16/9024

OTHER PUBLICATIONS

Scott, M. et al. "A framework for user driven data management"; Information Systems, vol. 42, No. 10, Dec. 2013, pp. 36-58.
Japanese Patent Application No. 2021-001601 Office Action dated Dec. 7, 2021, 4 pages.
Japanese Patent Application No. 2021-001601 English translation of Office Action dated Dec. 7, 2021, 4 pages.

* cited by examiner

METHOD, DEVICE, AND STORAGE MEDIUM FOR STORING DETERMINANT TEXT

CROSS-REFERENCE TO RELATED APPLICATION

This application claims priority to Chinese Patent Application No. 202010025931.2, filed on Jan. 10, 2020, the entire contents of which are incorporated herein by reference.

TECHNICAL FIELD

The disclosure relates to the field of data processing technologies, specifically to the field of text storage technologies, and more particularly, to a method for storing a determinant text, an electronic device, and a computer-readable storage medium.

BACKGROUND

A graph database, originating from Euler and graph theory, is a graph-oriented/graph-based database. The graph database is a database to store and query data in a data structure of "graph", rather than a database to store pictures, for example. The main input data of the graph database is determinant texts, and data retrieval is realized through large-scale storage of determinant texts.

In the related art, the following two methods are generally used to store determinant texts. The first one, the determinant text is converted into data in a json (JavaScript Object Notation) form for storage. However, in actual storage processes, data expands tremendously and a retrieval duration is long. The second one, the determinant text is stored sequentially, but the determinant texts stored sequentially have insufficient compression ratios, resulting in too many redundant fields and low retrieval efficiency.

SUMMARY

In a first aspect, the disclosure provides a method for storing a determinant text. The method includes: obtaining a determinant text that is to be stored, the determinant text including a plurality of fields; obtaining valid fields from the plurality of fields; querying a field type table according to the valid fields to generate a data description field of the determinant text; determining a value storage field of the determinant text according to contents of the plurality of fields and the field type table; and storing the data description field and the value storage field to store the determinant text.

In a second aspect, the disclosure provides an electronic device. The electronic device includes: at least one processor; and a memory having communication connection to the at least one processor. The memory stores instructions executable by the at least one processor. When the instructions are executed by the at least one processor, the at least one processor is caused to execute the above method according to the embodiments of the disclosure.

In a third aspect, the disclosure provides a non-transitory computer-readable storage medium storing computer instructions herein. The computer instructions are configured to cause a computer to execute the above method according to the embodiments of the disclosure.

The additional effects of the foregoing aspects will be described below in combination with specific embodiments.

BRIEF DESCRIPTION OF THE DRAWINGS

The accompanying drawings are used to better understand the solution, and do not constitute a limitation on the disclosure, in which.

DETAILED DESCRIPTION

The following describes the exemplary embodiments of the disclosure with reference to the accompanying drawings, which includes various details of the embodiments of the disclosure to facilitate understanding and shall be considered merely exemplary. Therefore, those of ordinary skill in the art should recognize that various changes and modifications may be made to the embodiments described herein without departing from the scope and spirit of the disclosure. For clarity and conciseness, descriptions of well-known functions and structures are omitted in the following description.

In order to solve problems of insufficient compression ratio and low retrieval efficiency in a method for storing a determinant text in the related art, the disclosure provides a method for storing a determinant text. With the method for storing the determinant text in the disclosure, the determinant text that is to be stored is obtained, and the determinant text includes the plurality of fields. The valid fields are obtained from the plurality of fields. The field type table is queried according to the valid fields to generate the data description field of the determinant text. The value storage field of the determinant text is determined according to the contents of the plurality of fields and the field type table. The data description field and the value storage field are stored to store the determinant text.

A method for storing a determinant text, an apparatus for storing a determinant text, and an electronic device according to embodiments of the disclosure are described below with reference to the accompanying drawings.

Figure 1:
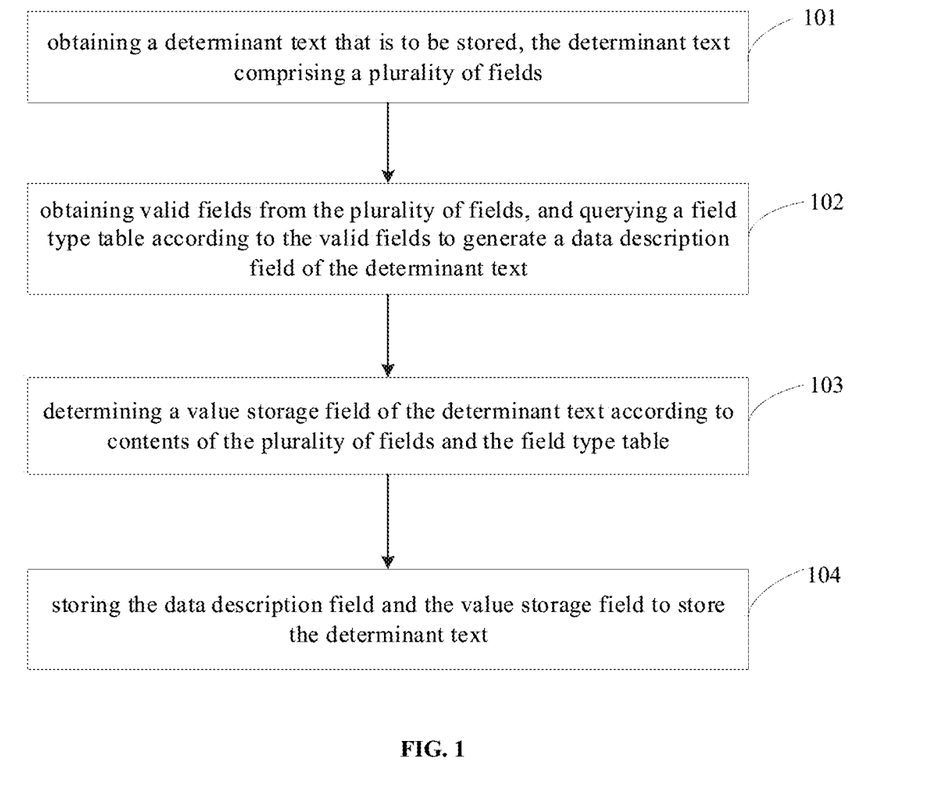
FIG. 1 is a flowchart of a method for storing a determinant text according to some embodiments of the disclosure.

FIG. 1 is a flowchart of a method for storing a determinant text according to some embodiments of the disclosure.

As illustrated in FIG. 1, the method for storing the determinant text includes the following.

At block 101, a determinant text that is to be stored is obtained. The determinant text may include a plurality of fields.

In some embodiments of the disclosure, the determinant text, also called a CSV (Comma-Separated Values) text, is table data stored in a form of a text file. For example, the following table is an example determinant text.

| name | age | city |
|---|---|---|
| Zhang San | 20 | Beijing |
| Li Si | 26 | Shanghai |
| Wang Wu | 30 | Guangzhou |

In some embodiments of the disclosure, before storing the determinant text that is to be stored to the database, the determinant text that is to be stored is obtained first, and the determinant text that is to be stored includes the plurality of fields.

As can be seen from the above table, when storing the determinant text, the determinant text that is to be stored includes the plurality of fields, and "columns" in the table may be referred to as the fields, and each field contains information on a particular topic. As mentioned above, the determinant text includes a "name" field, an "age" field, and a "place of residence" field (e.g., a "city" field). For another example, in the "address" database, "name" and "contact number" are attributes common to all rows in the table, so these columns are called the "name" field and the "contact number" field.

At block 102, valid fields are obtained from the plurality of fields, and a field type table is queried according to the valid fields to generate a data description field of the determinant text.

At block 103, a value storage field of the determinant text is determined according to contents of the plurality of fields and the field type table.

In some embodiments of the disclosure, the field type table includes a plurality of types. Each of the plurality of types includes a corresponding type identifier and a set of subtypes. Each subtype in the set of subtypes has a corresponding subtype serial number and an attribute. The attribute includes an attribute number, an attribute type, a default value and a determination on whether a corresponding value is allowed to be null.

In some embodiments of the disclosure, the valid fields in the plurality of fields included in the determinant text may refer to fields that need to be stored in the determinant text that is to be stored.

In some embodiments of the disclosure, the determinant text that is to be stored may be divided into two fields, namely the data description field and the value storage field.

In some embodiments of the disclosure, after obtaining the determinant text that is to be stored, the valid fields in the plurality of fields included in the determinant text may be obtained, and the field type table may be queried according to the valid fields to generate the data description field of the determinant text.

In some embodiments of the disclosure, the value storage field of the determinant text may be determined according to contents of the plurality of fields included in the determinant text that is to be stored and the field type table.

At block 104, the data description field and the value storage field are stored to store the determinant text.

In some embodiments of the disclosure, after generating the data description field and the value storage field of the determinant text data that is to be stored, the data description field and the value storage field constitute data of the determinant text for storage. Therefore, the compression and storage of the determinant text is realized, and the compression rate during data storage is improved.

Most of data in the determinant text may have default values, for example, "nation" may have a default of "Han", "Gender" may have a default of "Male" or "Female". For the value repeatedly used, the default value may also be set, then there is no need to store this value when storing, the value may be expressed by one bit, and the compression rate when performing storage on the determinant text is very high.

Figure 2:
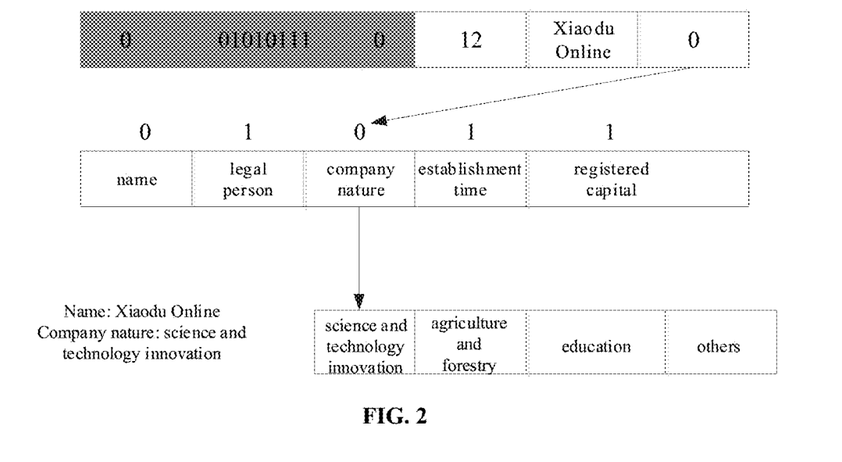
FIG. 2 is a schematic diagram of storing a determinant text according to some embodiments of the disclosure.

For example, as illustrated in FIG. 2, for data, a gray portion is the data description field. The valid fields are marked in FIG. 2. The determinant text is that name: "Xiaodu Online", Company nature: "science and technology innovation", and there is no "legal person", "establishment time" and "registered capital" in the determinant text. When storing the determinant text, there is no need to store "legal person", "establishment time" and "registered capital", and it only needs to mark the fields in the attribute states. "Company nature" is directly written as 0 firstly, and after querying the determinant text, this field is an enumeration value, and 0 represents the first enumeration value, so the value of "Company nature" is "science and technology innovation".

If the "establishment time" field is obtained, and it finds that the field does not exist through the attribute state, the determinant text is directly queried, and if there is a default value, the default value is returned.

Compared to the problem of inefficient retrieval in the sequential storage of the determinant texts, after storing the determinant text in the disclosure, when retrieving the content of the determinant text, since the attribute number or even the entire data description field may be stored, the status of the field is quickly located during retrieval, for example, whether the field exists, and where is the field located in the value storage field.

In some embodiments of the disclosure, the determinant text that is to be stored is obtained, and the determinant text that is to be stored includes the plurality of fields. The valid fields are obtained from the plurality of fields, and the field type table is queried according to the valid fields to generate the data description field of the determinant text. The value storage field of the determinant text is determined according to the contents of the plurality of fields and the field type table, and the determinant text data and the value storage field are stored as data of the determinant text. In this solution, the data description field and the value storage field of the determinant text are determined, and the data description field and the value storage field constitute the data of the determinant text for storage, thus the compression ratio of the determinant text for storage and data retrieval effectiveness are improved.

Figure 3:
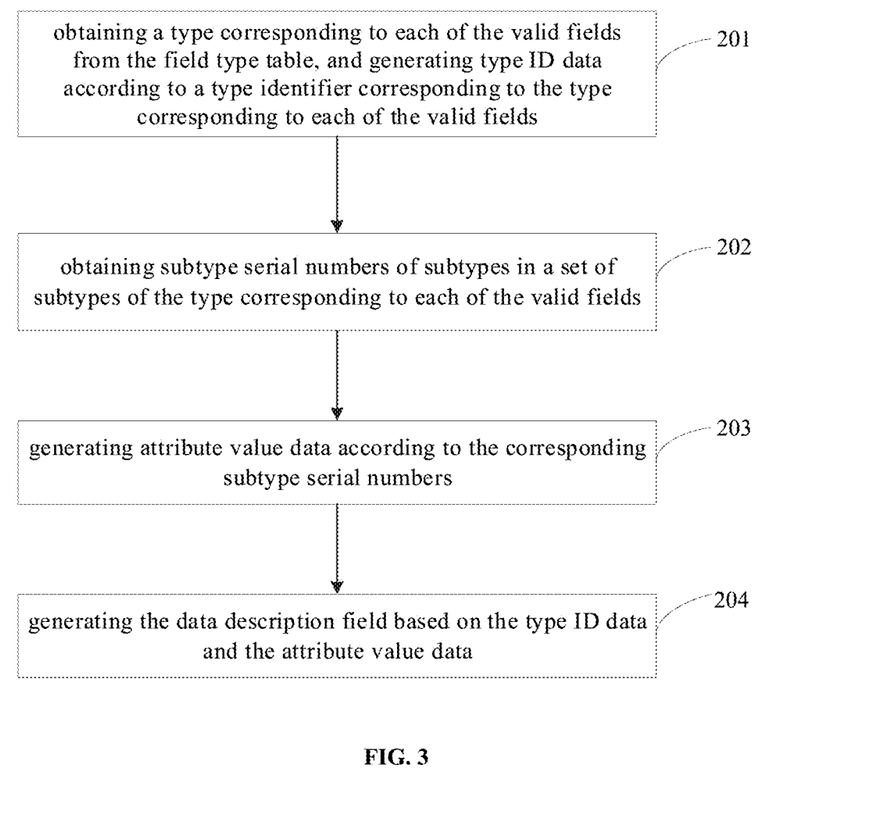
FIG. 3 is a flowchart of a method for storing a determinant text according to some embodiments of the disclosure.

As a possible implementation, in the above block 102, when querying the field type table according to the valid fields to generate the data description field of the determinant text, a type corresponding to each of the valid fields may also be obtained from the field type table, and type ID data is generated according to a type identifier corresponding to the type corresponding to each of the valid fields. Subtype serial numbers of subtypes in a set of subtypes, of the type corresponding to each of the valid fields, may be obtained, and attribute value data is generated according to the corresponding subtype serial numbers. Further, according to the type ID data and the attribute value data, the data description field is generated. The implementation process is described in detail below in combination with FIG. 3. FIG. 3 is a flowchart of a method for storing a determinant text according to some embodiments of the disclosure.

As illustrated in FIG. 3, the method for storing the determinant text may include the following.

At block 201, a type corresponding to each of the valid fields is obtained from the field type table, and type ID data is generated according to a type identifier corresponding to the type corresponding to each of the valid fields. That is, each type corresponding to the determinant text in the field type table is obtained, and the type ID data is generated according to each corresponding type identifier.

In some embodiments of the disclosure, the types in the field type table may be an integer type, a floating type, a character string type, an enumerated type, and a date and time type.

The enumerated type is a very special type, basically not in other databases. Similar to a foreign key table of mysql, in fact, in a real example, the field types of a large part of data are enumerated types, for example, "Company Type", "Industry", "Gender", "Transaction Type", and "Country & Region".

In some embodiments of the disclosure, after obtaining the plurality of fields included in the determinant text, the type to which each field belongs is determined in the corresponding field type table, and type ID data is generated according to the type identifier corresponding to each field.

For example, if the determinant text includes a company field, a bank field, and a personal field, each field corresponds to one type ID data, for example, the type ID data corresponding to the company field may be num1.

At block 202, subtype serial numbers of subtypes in a set of subtypes of the type corresponding to each of the valid fields are obtained. That is, the subtype serial numbers of the subtypes in the sets of subtypes, of the types corresponding to the valid fields, are obtained.

In some embodiments of the disclosure, not all fields in the plurality of fields included in the determinant text are valid fields. In order to improve the compression rate when storing the determinant text, the subtype serial numbers of the subtypes in the sets of subtypes, of the types corresponding to the valid fields, may be obtained.

At block 203, attribute value data is generated according to the corresponding subtype serial numbers.

In some embodiments of the disclosure, after obtaining the subtype serial number of each subtype, attribute value data is generated according to a determination on whether each subtype exists in the determinant text.

For example, the field types included in the field type table and in the determinant text are "name", "legal person", "company nature", "establishment time" and "registered capital", and the set of subtypes corresponding to the field type "company nature" are "science and technology innovation", "agriculture and forestry", "education" and "others". After obtaining the subtype serial number of each subtype in the set of subtypes, corresponding to each of the types of the valid fields, it is determined that the attribute value data of the type "name" and "company nature" both is 1, and the attribute value data generated by the remaining types are all 0. There is no need to store fields whose attribute value data is 0, thereby improving the data compression rate during data storage and saving storage space.

At block 204, the data description field is generated based on the type ID data and the attribute value data.

Both the type ID data and the attribute value data are variable-length integers. The type ID data and the attribute value data are compressed and stored by using "a reference length plus a step length" to avoid reserving a lot of space during data storage. Therefore, the compression rate of data storage is improved, and the space for data storage is saved.

The variable-length integer employs 1 flag bit and 7 data bits to compress a positive integer value. The role of the flag bit is to indicate whether the value of the remaining data bits except for 7 data bits, is 0. The specific calculation method is as follows. An AND operation is performed between the value and 0x7f. If the value is 0, the effective data bit of the value is 7 bits, otherwise, the value is 1, which indicates that there is still valid data, and the value is shifted to the right by 7 bits to continue the above steps until the value is 0, thereby achieving compression and storage of data and improving data compression rate.

In some embodiments of the disclosure, after determining the type ID data corresponding to each field in the determinant text and attribute values corresponding to the valid fields, the data description field is generated according to the type ID data and the attribute value data.

The method for storing the determinant text according to the embodiments of the disclosure, by obtaining the type corresponding to the determinant text in the field type table, and the type ID data is generated according to the type identifier of the corresponding type. The subtype serial number of the subtype in the set of subtypes, of each type corresponding to the valid fields, is obtained. The attribute value data according to the corresponding subtype serial number is generated. Data description field is generated based on the type ID data and the attribute value data. As a result, the data compression rate during data storage is improved, and storage space is saved.

Figure 4:
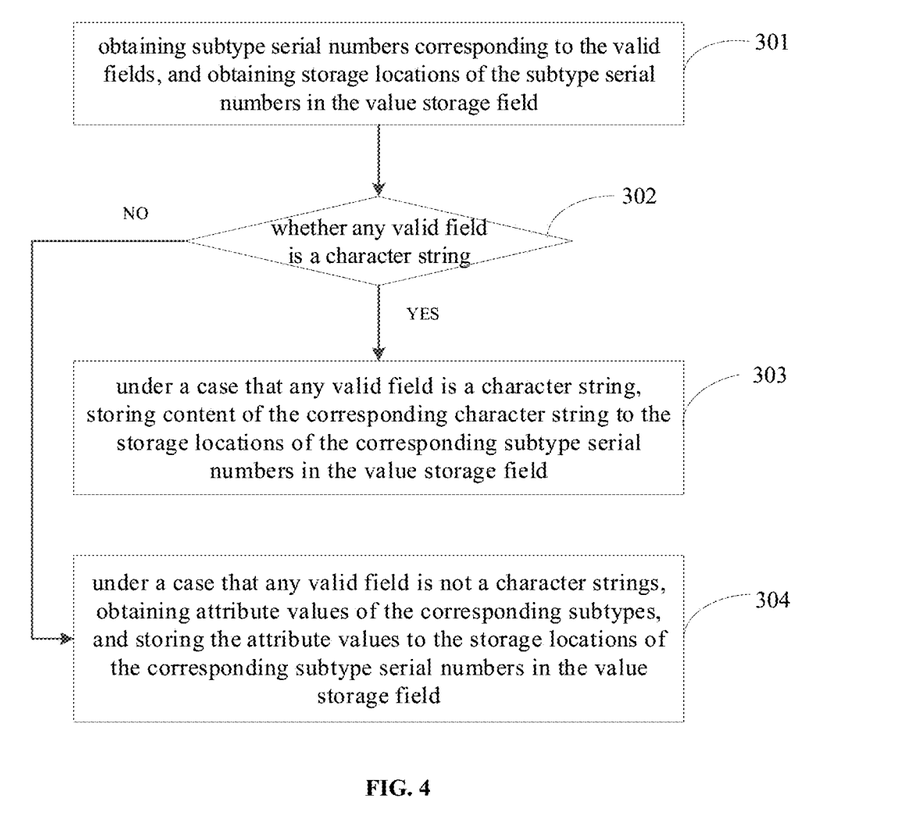
FIG. 4 is a flowchart of a method for storing a determinant text according to some embodiments of the disclosure.

As a possible implementation, at the above block 103, when determining the value storage field of the determinant text according to the contents of the plurality of fields and the field type table, subtype serial numbers corresponding to the valid fields are obtained, and storage locations of the subtype serial number in the value storage field are obtained to store the valid fields based on whether the valid fields are character strings. The above process is described in detail below in combination with FIG. 4. FIG. 4 is a flowchart of a method for storing a determinant text according to some embodiments of the disclosure.

As illustrated in FIG. 4, the method for storing the determinant text includes the following.

At block 301, subtype serial numbers corresponding to the valid fields are obtained, and storage locations of the subtype serial numbers in the value storage field are obtained.

In some embodiments of the disclosure, the determinant text that is to be stored is obtained, and the valid fields in the plurality of fields included in the determinant text are determined. Further, the subtype serial numbers corresponding to the valid fields and the storage locations of the subtype serial numbers in the value storage field are obtained.

For example, if the determinant text that is to be stored includes types of "company", "bank", and "personal", the type of "company" includes subtypes of "name", "legal person", "company nature", "establishment time" and "registered capital". In addition, each subtype has a corresponding subtype serial number and attribute. The attribute includes an attribute number, an attribute type, a default value, and a determination on whether the value is allowed to be null.

Taking the example in FIG. 2 as an example, suppose the determinant text that is to be stored is the name: "Xiaodu Online"; company nature: "science and technology innovation", the subtypes corresponding to the valid fields of the determinant text that is to be stored may be "name" and "company nature". Further, the subtype serial numbers corresponding to the valid fields and the storage locations of the subtype serial numbers in the value storage field are obtained.

At block 302, it is determined whether any valid field is a character string.

In some embodiments of the disclosure, after obtaining the valid fields of the determinant text that is to be stored, it is determined whether any valid field is the character string, so as to store the valid field according to the type corresponding to the valid field.

At block 303, if it is determined that any valid field is a character string, content of the corresponding character string is stored to the storage locations of the corresponding subtype serial numbers in the value storage field.

In some embodiments of the disclosure, when it is determined that any valid field of the determinant text that is to be stored is the character string, the character string content of the valid field may be stored to the storage locations of the corresponding subtype serial numbers in the value storage field.

At block 304, if it is determined that any valid field is not a character string, attribute values of the corresponding subtypes are obtained, and the attribute values are stored to the storage locations of the corresponding subtype serial numbers in the value storage field.

In some embodiments of the disclosure, when it is determined that any valid field of the determinant text that is to be stored is not the character string, the attribute values of the subtypes corresponding to the valid field are obtained, and the attribute values are stored to the storage locations of the corresponding subtype serial numbers in the value storage field.

For example, as illustrated in FIG. 2, since the attribute value of the subtype corresponding to "company nature" is 0, after querying the field type table, it is determined that the field corresponding to "business nature" is an enumeration type. 0 represents a first value of the enumeration type, so the value corresponding to "company nature" is "science and technology innovation". Therefore, after obtaining the attribute value of the subtype corresponding to "company nature", the attribute value is stored to the storage location of the subtype serial number in the value storage field.

With the method for storing the determinant text, by obtaining the subtype serial numbers corresponding to the valid fields, and the storage locations of the subtype serial numbers in the value storage field, if it is determined that any valid field is the character string, the content of the character string of the valid field may be stored to the storage locations of the subtype serial numbers in the value storage field, and if it is determined that any valid field is not the character string, the attribute values of the subtypes corresponding to the valid field are obtained, and the attribute values are stored to the storage locations of the subtype serial numbers in the value storage field. Therefore, the compression ratio when storing the determinant text that is to be stored is improved, and the storage space is saved.

In order to implement the above embodiments, the embodiments of the disclosure provide an apparatus for storing a determinant text.

Figure 5:
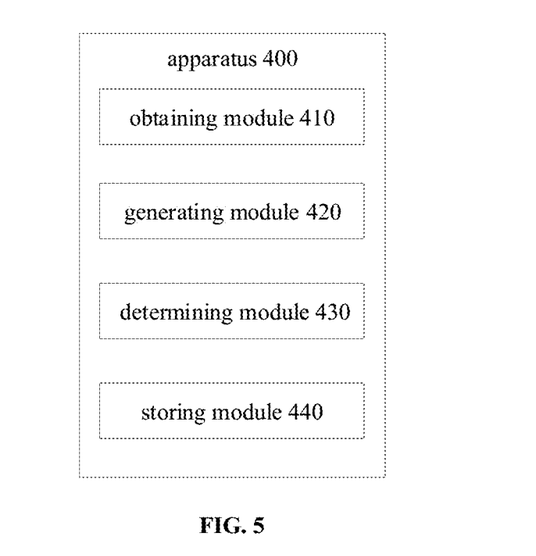
FIG. 5 is a block diagram of an apparatus for storing a determinant text according to some embodiments of the disclosure.

FIG. 5 is a block diagram of an apparatus for storing a determinant text according to some embodiments of the disclosure.

As illustrated in FIG. 5, the apparatus 400 for storing the determinant text includes: an obtaining module 410, a generating module 420, a determining module 430, and a storing module 440.

The obtaining module 410 is configured to obtain a determinant text that is to be stored, the determinant text including a plurality of fields.

The generating module 420 is configured to obtain valid fields from the plurality of fields, and query a field type table according to the valid fields to generate a data description field of the determinant text.

The determining module 430 is configured to determine a value storage field of the determinant text according to contents of the plurality of fields and the field type table.

The storing module 440 is configured to store the data description field and the value storage field to store the determinant text.

As a possible implementation, the field type table includes a plurality of types. Each of the plurality of types includes a type identifier and a set of subtypes. Each subtype in the set of subtypes has a corresponding subtype serial number and an attribute. The attribute includes an attribute number, an attribute type, a default value and a determination on whether a corresponding value is allowed to be null.

As a possible implementation, the generating module 420 is further configured to: obtain a type corresponding to each of the valid fields from the field type table; generate type ID data according to a type identifier corresponding to the type corresponding to each of the valid fields; obtain subtype serial numbers of subtypes in a set of subtypes of the type corresponding to each of the valid fields; generate attribute value data according to the corresponding subtype serial numbers; and generate the data description field based on the type ID data and the attribute value data.

As a possible implementation, the determining module 430 is further configured to: obtain subtype serial numbers corresponding to the valid fields; obtain storage locations of the subtype serial numbers in the value storage field; under a case that any valid field is a character string, store content of the corresponding character string to the storage locations of the corresponding subtype serial numbers in the value storage field; and under a case that any valid field is not a character strings, obtain attribute values of the corresponding subtypes, and store the attribute values to the storage locations of the corresponding subtype serial numbers in the value storage field.

As a possible implementation, the type ID data and the attribute value data are stored as variable-length integers.

With the apparatus for storing the determinant text according to embodiments of the disclosure, the determinant text that is to be stored is obtained, and the determinant text that is to be stored includes the plurality of fields. The valid fields are obtained from the plurality of fields, and the field type table is queried according to the valid fields to generate the data description field of the determinant text. The value storage field of the determinant text is determined according to the contents of the plurality of fields and the field type table, and the determinant text data and the value storage field are stored as data of the determinant text. In this solution, the data description field and the value storage field of the determinant text are determined, and the data description field and the value storage field constitute the data of the determinant text for storage, thus the compression ratio of the determinant text for storage and data retrieval effectiveness are improved.

According to the embodiments of the disclosure, the disclosure also provides an electronic device and a readable storage medium.

Figure 6:
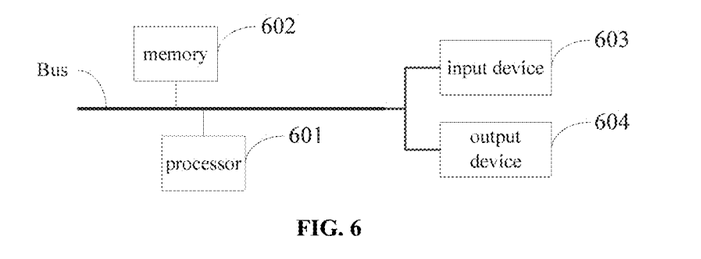
FIG. 6 is a block diagram of an electronic device for implementing a method for storing a determinant text according to some embodiments of the disclosure.

FIG. 6 is a block diagram of an electronic device for implementing the method for storing the determinant text according to some embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 6, the electronic device includes: one or more processors 601, a memory 602, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 601 is taken as an example in FIG. 6.

The memory 602 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 602 is configured to store non-transitory software programs, non-transitory computer executable programs and modules, such as program instructions/modules corresponding to the method in the embodiments of the disclosure (For example, the obtaining module 410, the generating module 420, the determining module 430, and the storing module 440 shown in FIG. 4). The processor 601 executes various functional applications and data processing of the server by running non-transitory software programs, instructions, and modules stored in the memory 602, that is, implementing the method for storing the determinant text in the foregoing method embodiment.

The memory 602 may include a storage program area and a storage data area, where the storage program area may store an operating system and application programs required for at least one function. The storage data area may store data created according to the use of the electronic device, and the like. In addition, the memory 602 may include a high-speed random access memory, and a non-transitory memory, such as at least one magnetic disk storage device, a flash memory device, or other non-transitory solid-state storage device. In some embodiments, the memory 602 may optionally include a memory remotely disposed with respect to the processor 601, and these remote memories may be connected to the electronic device through a network. Examples of the above network include, but are not limited to, the Internet, an intranet, a local area network, a mobile communication network, and combinations thereof.

The electronic device for implementing the method for storing the determinant text may further include: an input device 603 and an output device 604. The processor 601, the memory 602, the input device 603, and the output device 604 may be connected through a bus or in other manners. In FIG. 6, the connection through the bus is taken as an example.

The input device 603 may receive inputted numeric or character information, and generate key signal inputs related to user settings and function control of an electronic device, such as a touch screen, a keypad, a mouse, a trackpad, a touchpad, an indication rod, one or more mouse buttons, trackballs, joysticks and other input devices. The output device 604 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

With the method for storing the determinant text according to embodiments of the disclosure, the determinant text that is to be stored is obtained, and the determinant text that is to be stored includes the plurality of fields. The valid fields are obtained from the plurality of fields, and the field type table is queried according to the valid fields to generate the data description field of the determinant text. The value storage field of the determinant text is determined according to the contents of the plurality of fields and the field type table, and the determinant text data and the value storage field are stored as data of the determinant text. In this solution, the data description field and the value storage field of the determinant text are determined, and the data description field and the value storage field constitute the data of the determinant text for storage, thus the compression ratio of the determinant text for storage and data retrieval effectiveness are improved.

It should be understood that various forms of processes shown above may be used to reorder, add, or delete steps. For example, the steps described in the disclosure may be performed in parallel, sequentially, or in different orders. As long as the desired results of the technical solutions disclosed in the disclosure can be achieved, no limitation is made herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

What is claimed is:

1. A method for storing a determinant text, comprising:
    obtaining a determinant text that is to be stored, the determinant text comprising a table, the table comprising a plurality of columns as a plurality of fields;
    obtaining valid fields from the plurality of fields;
    querying a field type table according to the valid fields to generate a data description field of the determinant text, wherein the field type table comprises a plurality of types, the plurality of types comprise an integer type, a floating type, a character string type, an enumerated type, and a date and time type, each of the plurality of types comprises a type identifier and a set of subtypes; each subtype in the set of subtypes has a corresponding subtype serial number and an attribute, the attribute comprises an attribute number, an attribute type, a default value and a determination on whether a corresponding value is allowed to be null; wherein the querying the field type table according to the valid fields to generate the data description field of the determinant text, comprises: obtaining a type corresponding to each of the valid fields from the field type table; generating type ID data according to a type identifier corresponding to the type corresponding to each of the valid fields; obtaining subtype serial numbers of subtypes in a set of subtypes of the type corresponding to each of the valid fields; generating attribute value data according to the corresponding subtype serial numbers; and generating the data description field based on the type ID data and the attribute value data;
    determining a value storage field of the determinant text according to contents of the plurality of fields and the field type table; and
    storing the data description field and the value storage field to store the determinant text.

2. The method as claimed in claim 1, wherein the determining the value storage field of the determinant text according to the contents of the plurality of fields and the field type table comprises:
    determining the value storage field of the determinant text according to contents of the valid fields and the field type table.

3. The method as claimed in claim 2, wherein the determining the value storage field of the determinant text according to the contents of the valid fields and the field type table comprises:
    obtaining subtype serial numbers corresponding to the valid fields;
    obtaining storage locations of the subtype serial numbers in the value storage field;
    under a case that any valid field is a character string, storing content of the corresponding character string to the storage locations of the corresponding subtype serial numbers in the value storage field; and
    under a case that any valid field is not a character strings, obtaining attribute values of the corresponding subtypes, and storing the attribute values to the storage locations of the corresponding subtype serial numbers in the value storage field.

4. The method as claimed in claim 1, wherein the type ID data and the attribute value data are stored as variable-length integers.

5. An electronic device, comprising:
    at least one processor; and
    a memory having communication connection to the at least one processor and configured to store instructions executable by the at least one processor,
    when the instructions are executed by the at least one processor, the at least one processor is caused to execute a method for storing a determinant text, the method comprising:
    obtaining a determinant text that is to be stored, the determinant text comprising a table, the table comprising a plurality of columns as a plurality of fields;
    obtaining valid fields from the plurality of fields;
    querying a field type table according to the valid fields to generate a data description field of the determinant text, wherein the field type table comprises a plurality of types, the plurality of types comprise an integer type, a floating type, a character string type, an enumerated type, and a date and time type, each of the plurality of types comprises a type identifier and a set of subtypes; each subtype in the set of subtypes has a corresponding subtype serial number and an attribute, the attribute comprises an attribute number, an attribute type, a default value and a determination on whether a corresponding value is allowed to be null; wherein the querying the field type table according to the valid fields to generate the data description field of the determinant text, comprises: obtaining a type corresponding to each of the valid fields from the field type table; generating type ID data according to a type identifier corresponding to the type corresponding to each of the valid fields; obtaining subtype serial numbers of subtypes in a set of subtypes of the type corresponding to each of the valid fields; generating attribute value data according to the corresponding subtype serial numbers; and generating the data description field based on the type ID data and the attribute value data;

determining a value storage field of the determinant text according to contents of the plurality of fields and the field type table; and storing the data description field and the value storage field to store the determinant text.

6. The electronic device as claimed in claim 5, wherein the determining the value storage field of the determinant text according to the contents of the plurality of fields and the field type table comprises:

determining the value storage field of the determinant text according to contents of the valid fields and the field type table.

7. The electronic device as claimed in claim 6, wherein the determining the value storage field of the determinant text according to the contents of the valid fields and the field type table comprises:

obtaining subtype serial numbers corresponding to the valid fields;

obtaining storage locations of the subtype serial numbers in the value storage field;

under a case that any valid field is a character string, storing content of the corresponding character string to the storage locations of the corresponding subtype serial numbers in the value storage field; and under a case that any valid field is not a character strings, obtaining attribute values of the corresponding subtypes, and storing the attribute values to the storage locations of the corresponding subtype serial numbers in the value storage field.

8. The electronic device as claimed in claim 5, wherein the type ID data and the attribute value data are stored as variable-length integers.

9. A non-transitory computer-readable storage medium storing computer instructions thereon, wherein the computer instructions are configured to cause a computer to execute a method for storing a determinant text, the method comprising:

obtaining a determinant text that is to be stored, the determinant text comprising a table, the table comprising a plurality of columns as a plurality of fields;

obtaining valid fields from the plurality of fields;

querying a field type table according to the valid fields to generate a data description field of the determinant text, wherein the field type table comprises a plurality of types, the plurality of types comprise an integer type, a floating type, a character string type, an enumerated type, and a date and time type, each of the plurality of types comprises a type identifier and a set of subtypes; each subtype in the set of subtypes has a corresponding subtype serial number and an attribute, the attribute comprises an attribute number, an attribute type, a default value and a determination on whether a corresponding value is allowed to be null; wherein the querying the field type table according to the valid fields to generate the data description field of the determinant text, comprises: obtaining a type corresponding to each of the valid fields from the field type table; generating type ID data according to a type identifier corresponding to the type corresponding to each of the valid fields; obtaining subtype serial numbers of subtypes in a set of subtypes of the type corresponding to each of the valid fields; generating attribute value data according to the corresponding subtype serial numbers; and generating the data description field based on the type ID data and the attribute value data;

determining a value storage field of the determinant text according to contents of the plurality of fields and the field type table; and storing the data description field and the value storage field to store the determinant text.

10. The non-transitory computer-readable storage medium as claimed in claim 9, wherein the determining the value storage field of the determinant text according to the contents of the plurality of fields and the field type table comprises:

determining the value storage field of the determinant text according to contents of the valid fields and the field type table.

11. The non-transitory computer-readable storage medium as claimed in claim 10, wherein the determining the value storage field of the determinant text according to the contents of the valid fields and the field type table comprises:

obtaining subtype serial numbers corresponding to the valid fields;

obtaining storage locations of the subtype serial numbers in the value storage field;

under a case that any valid field is a character string, storing content of the corresponding character string to the storage locations of the corresponding subtype serial numbers in the value storage field; and under a case that any valid field is not a character strings, obtaining attribute values of the corresponding subtypes, and storing the attribute values to the storage locations of the corresponding subtype serial numbers in the value storage field.

12. The non-transitory computer-readable storage medium as claimed in claim 9, wherein the type ID data and the attribute value data are stored as variable-length integers.

* * * * *